B. F. Graves,
Cow Milker.
No. 79,568. Patented July 7, 1868.
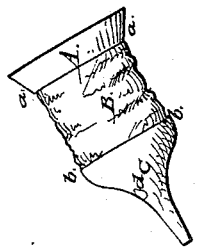
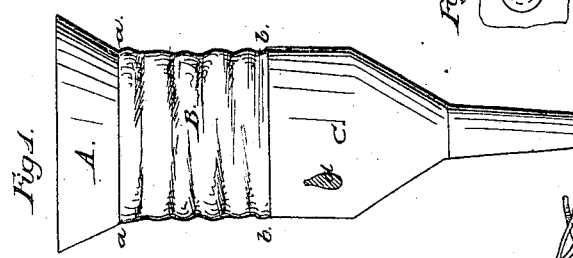
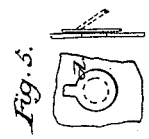
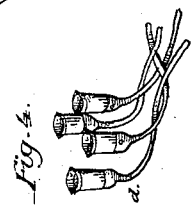
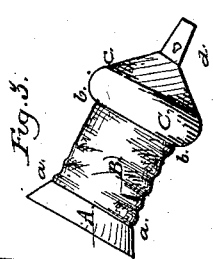
Witnesses:
Inventor:
Benj. F. Graves.

United States Patent Office.

BENJAMIN F. GRAVES, OF GROTON, MASSACHUSETTS.

Letters Patent No. 79,568, dated July 7, 1868.

IMPROVEMENT IN TEAT-CUP FOR MILKING.

The Schedule referred to in these Letters Patent and making part of the same.

TO ALL WHOM IT MAY CONCERN:

Be it known that I, BENJAMIN F. GRAVES, of Groton, in the county of Middlesex, and State of Massachusetts, have invented a new and improved Teat-Cup, to be used as a part of any known mechanical apparatus for milking cows; and I do hereby declare that the following is a full and exact description thereof, reference being had to the accompanying drawings, and to the letters of reference marked thereon.

The nature of my invention consists in constructing a teat-cup of such materials and in such a manner that the upper portion thereof, embracing the udder of the cow, and also the under portion thereof, commencing just above the end of the teat of the cow, shall be unelastic and incompressible; and the middle portion, embracing the teat, shall be made of an elastic or compressible material, yielding readily to the eduction-draught of the pump, by which the operation of milking is performed, and thereby accomplishing, as near as may be, the action of the hand in forcing the milk from the teat.

To enable others skilled in the art to make and use my invention, I will proceed to describe its construction and operation.

I construct my teat-cup in various forms, as seen in Figures 1, 2, and 3, A comprising that part of the cup above the line $a\ a$, at the mouth or orifice which receives the teat, and, in the operation of milking, closely fits upon the udder. I make this portion of the cup of hard India rubber, or of any suitable material, which will not admit of elasticity or compression. B is the barrel of the cup, or that portion of it which embraces the teat of the cow, and should be made of elastic India rubber, leather, or other suitable material. $e$ is the tunnel part of the cup, which I also make of hard rubber, or other suitable material, which will not admit of compression or collapse, this tunnel or tube part of $e$ to be perforated and fitted with a valve for the escape of air, as represented at $d$, and all in the forms as represented in the various figures, 1, 2, 3, and 4.

In order to prevent the end of the teat from being compressed, and thus retarding or hindering the flow of milk, the tunnel part of the cup $e$ should extend a little above the end.

My improved teat-cup is designed to be used in any mechanical apparatus for milking cows, and its operation is as follows: I insert the tube of the tunnel part of the cup in any suitable pumping-apparatus fitted to perform the operation of drawing off the milk of the cow. I then adjust the cup to the teat of the cow. I then apply the pump, by which the operation of milking is effected, which compresses the barrel portion of the cup B upon the teat with each downward movement of the piston of the pump, and relaxes it with each upward motion, thus imitating the action of the hand upon the teat in the operation of milking.

Having described the construction and operation of my said invention, what I claim, and desire to secure by Letters Patent, is—

A teat-cup, to be used in milking cows, constructed and operating substantially as above described.

BENJ. F. GRAVES.

Witnesses:
 DAVID ROBERTS,
 DANIEL NEEDHAM.